United States Patent [19]

Martin

[11] Patent Number: 5,063,481

[45] Date of Patent: Nov. 5, 1991

[54] PIVOT ASSEMBLY FOR VEHICLE HEADLIGHT POSITION ADJUSTMENT

[75] Inventor: John P. Martin, Timberlake, Ohio

[73] Assignee: Eaton Corporation, Cleveland, Ohio

[21] Appl. No.: 597,655

[22] Filed: Oct. 15, 1990

[51] Int. Cl.$^5$ .............................................. B60Q 1/02
[52] U.S. Cl. ...................................... 362/61; 362/66; 362/419; 362/421
[58] Field of Search ...................... 362/61, 66, 80, 418, 362/419, 420, 421, 427, 428, 457

[56] References Cited

U.S. PATENT DOCUMENTS 4,774,645 9/1988 Iwamoto .............................. 362/457
4,870,544 9/1989 Iwamoto .............................. 362/428

Primary Examiner—Ira S. Lazarus
Assistant Examiner—Sue Hagarman
Attorney, Agent, or Firm—A. E. Chrow

[57] ABSTRACT

A pivot assembly is provided for providing a pivot point for positioning a vehicular headlight mounted on a movable frame relative to a fixed frame. The assembly comprises a ball stud (50) that is secured to a selected one of the fixed and movable frames by a retainer clip (60) that has an edge (28) that engages a transverse annular groove (10) in ball stud (50) to prevent axial movement and has at least one resilient arm (24) having a free-end 26 that engages one of a plurality of circumferentially spaced grooves (14) that are in substantial transverse relationship to annular groove (10) and that cooperate with free-end (26) to prevent ball stud (50) from rotating.

4 Claims, 2 Drawing Sheets

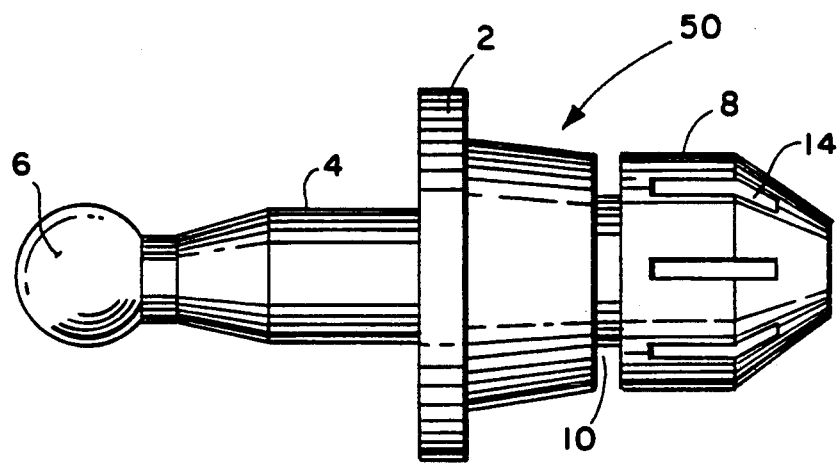
Fig. 1
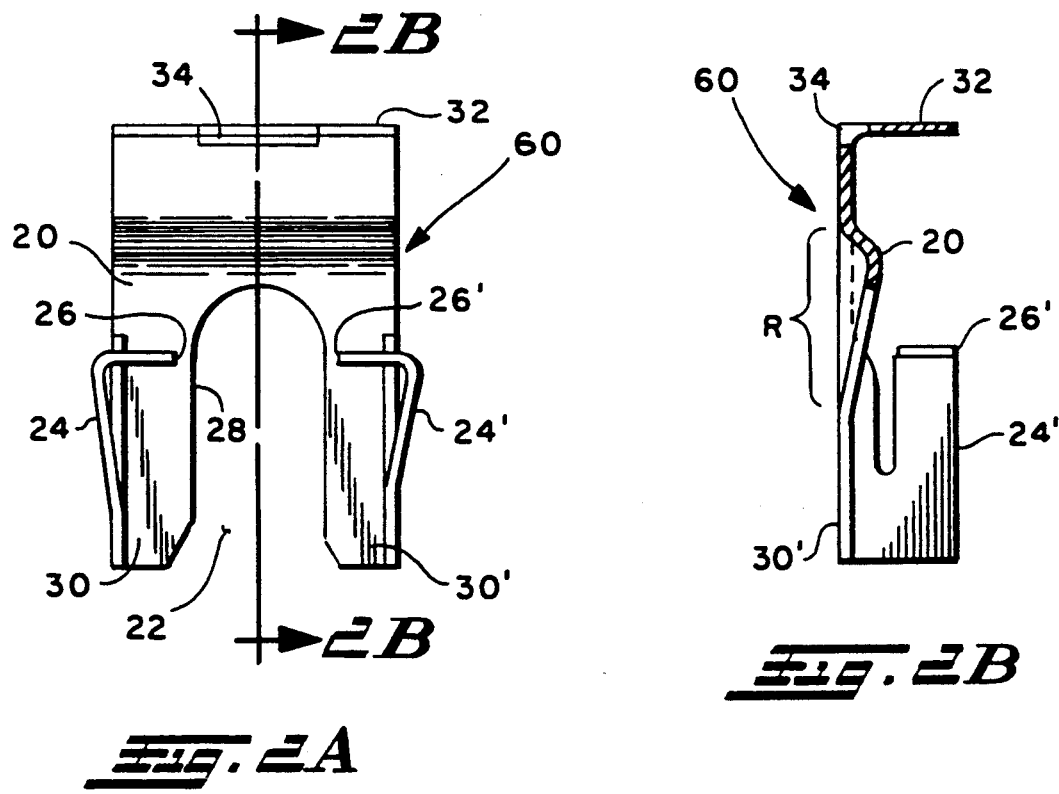
Fig. 2A
Fig. 2B

PIVOT ASSEMBLY FOR VEHICLE HEADLIGHT POSITION ADJUSTMENT

INTRODUCTION

This invention relates generally to vehicle headlight position adjusters and more particularly to a releasable pivot assembly that provides a fulcrum about which the headlight is pivoted during the positioning process.

BACKGROUND OF THE INVENTION

Vehicle headlight position adjusters have been used for many years. Typically the headlight is mounted on a movable frame and threaded screw adjusters of one kind or another are used at one or more locations to move the movable frame relative to a fixed frame on the vehicle an amount sufficient to aim the headlight as desired. Commonly at least two of such screw adjusters are employed so as to be able to position the headlight in both the horizontal and vertical planes.

In many instances, pivots are used such that the movable frame pivots about a particular point as its position is being adjusted. Examples of headlight adjusters that utilize pivots are disclosed in U.S. Pat. Nos. 4,188,655; 4,197,491; 4,503,486; 4,574,334; 4,712,164; 4,739,223; and 4,760,499, the disclosures of which are incorporated herein by reference. All of the pivots however are either integral with or bolted to the movable frame or fixed frame or, if a snap in type such as disclosed in U.S. Pat. No. 4,574,334, it appears that it must be inserted from behind the frame with no precaution having been taken to prevent it from rotating.

SUMMARY OF THE INVENTION

Accordingly, it is an object of this invention to provide a releasable pivot assembly for providing a pivot point for positioning a vehicle headlight.

It is another object of this invention to provide a pivot assembly for positioning a vehicle headlight that is easily inserted through the front of the frame to which it is secured and is prevented from both axial and rotational movement.

It is still another object of this invention to provide a pivot assembly for positioning a vehicular headlight that is quick to install, is easily attached and detached, and is prevented from both axial and rotational movement.

BRIEF DESCRIPTION OF THE DRAWINGS

FIG. 1 is a side view of an embodiment of a ball stud 50 that is part of the pivot assembly of the invention;

FIG. 2A is a front view of an embodiment of a retainer clip 60 that is used in conjunction with ball stud 50 of FIG. 1;

FIG. 2B is a central cross section through retainer clip 60 taken along view line 2B-2B of FIG. 2A.

DESCRIPTION OF SOME PREFERRED EMBODIMENTS

Figure 3:
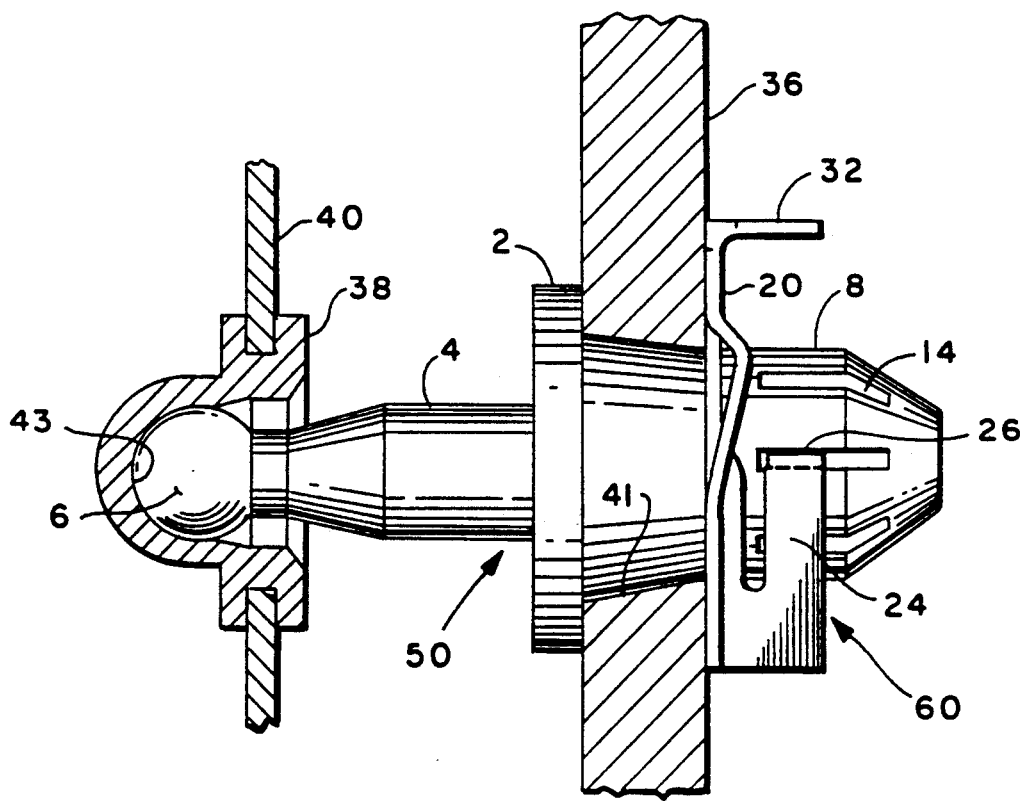
FIG. 3 is a partial cross sectional view of assembly of the invention showing ball stud 50 secured to a fixed frame 36 and operable to provide a pivot point for a movable frame 40.

In FIG. 1, ball stud 50 has a flange 2 with a first elongate portion 4 extending substantially transversely in one direction therefrom and a second elongate portion 8 extending substantially transversly in an opposite direction therefrom in substantial axial alignment with portion 4. Portion 4 extends from flange 2 to a free-end shaped into a sphere or ball-like configuration 6 operative to provide a pivot point or surface. Portion 4 is preferably substantially cylindrical in shape between flange 2 and sphere or ball 6.

Portion 8 is substantially cylindrical in shape and has a transverse annular groove 10 in the outer surface thereof in predetermined spaced relationship from flange 2 which is determined primarily by the thickness of the frame to which ball stud 50 is to be secured.

The section of portion 8 between flange 2 and groove 10 preferably tapers radially inwardly in a direction away from flange 2 so as to provide a wedging action in the opening of the frame through which ball stud 50 is inserted as shown in FIG. 3.

Ball stud 50 includes a plurality of circumferentially spaced elongate grooves 14 adjacent the free-end thereof that are substantially transverse to annular groove 10 and are preferably circumferentially equi-distant from each other.

Ball stud 50 is releasably secured to a selected one of the movable or fixed frames involved in positioning the vehicle headlight by means of a retainer clip of which a preferred embodiment is referenced by numeral 60 in FIGS. 2A and 2B.

Clip 60 has a base portion 20 that is preferably warped over a region "R" shown in FIG. 2B to enhance its ability to secure ball stud 50 snugly to the frame.

Clip 60 has an open ended slot 22 at one end between legs 30 and 30'. Slot 22 is surrounded by an edge 28 of base portion 20 that is adapted to be received into annular groove 10 when ball stud 50 is received into slot 22.

Clip 60 has at least one resilient arm 24 and preferably two arms 24 and 24' disposed on opposite sides of slot 22 that extend from base portion 20 and are configured such that their respective free-ends 26 and 26' are received into respective circumferentially spaced grooves 14 when edge 28 of slot 22 is received into an annular groove 10 of ball stud 50.

Clip 60 preferably includes a lip 32 extending transversely from the opposite end of base portion 20 as shown in FIG. 2B. Lip 32 is adapted to assist in one's pressing edge 28 into annular groove 10 to secure ball stud 50 to the frame and also to aid in removing clip 60 from ball stud 50.

Clip 60 may also include an opening 34 at the intersection of base portion 2 and lip 32 so that a pry tool of some type can be used to remove clip 60 from ball stud 50 when necessary.

Clip 60 can also be used to secure other headlight position adjustment members when the members to be fastened include the annular groove and circumferentially spaced grooves hereinbefore described such as disclosed in U.S. Pat. Nos. 4,735,534 and 4,706,494, assigned to the assignee of the present invention and the disclosures of which are incorporated herein by reference.

Although the reverse may be the case as previously described, in FIG. 3, clip 60 is used to secure ball stud 50 to stationary or fixed frame 36.

In practice, the second portion 8 of ball stud 50 is inserted through opening 41 through frame 36 until flange 2 abuts against the side of frame 36. Clip 50 is then pressed downwardly on the opposite side of frame 36 so that annular groove 10 is received into slot 22 and is engaged by edge 28 to secure ball stud 60 snugly to frame 36 and prevent it from axial movement relative to opening 41 of frame 36.

As previously described, the surface of ball stud 50 between flange 2 and annular groove 10 is preferably tapered to provide a wedging action when it is secured to the frame by clip 60. Likewise, the hole or opening through the frame may also be tapered as shown in FIG. 3.

As previously described, free-end 26 of arm 24 engages one of circumferentially spaced grooves 14 to prevent ball stud 50 from rotating relative to opening 41 of frame 36 and preferably the free-end 26' of the second arm 24' engages a groove 14 diametrically opposite to that engaged by free-end 26 of arm 24.

When secured to stationary frame 36 as shown in FIG. 3, ball 6 of first portion 4 of ball stud 50 is pivotably engaged with movable frame 40 on which the headlight is mounted (not shown).

Although various types of pivotable engagement arrangements between ball 6 and frame 40 may be employed, it is common to use some type of insert such as insert 38 that is securable to frame 40 and includes a cavity 43 that is adapted to enable frame 40 to pivot about head 6.

Although ball stud 50 and clip 60 may be made from any suitable material, ball stud 50 is preferably made from a plastic such as nylon and clip 60 is preferably made from a resilient metal such as spring steel.

What is claimed is:

1. A releasable pivot assembly for providing a stationary pivot point for positioning a vehicle headlight mounted upon a movable frame relative to a fixed frame, said assembly comprising a one piece ball stud and a retainer clip, said ball stud including;
   a flange;
   a first elongate portion extending substantially transversely from one side of the flange to a free-end thereof having a ball-like configuration adapted for pivotal engagement with a selective one of the fixed and movable frames;
   a second substantially cylindrical portion extending substantially transversely from the opposite side of the flange in substantial axial alignment with the first portion to a free-end thereof, said second portion having an annular groove disposed in the outer surface thereabout in predetermined spaced-apart relationship to the flange;
   said outer surface between the annular groove and the free-end having a plurality of circumferentially spaced grooves disposed therein in substantial transverse relationship to the annular groove;
   said retainer clip having a base portion having an open-ended slot at one end surrounded by an edge of the base member adapted to be received into the annular groove, and at least one resilient arm extending from the base member and configured such that a free-end thereof is receivable into one of the ball stud circumferentially spaced grooves when the retainer clip slot edge is received into the annular groove;
   said assembly operative such that, when the ball stud second portion is inserted through an opening in the selected one of the fixed and movable frames with the flange abutting against one side thereof, the ball stud first portion extends away therefrom towards the other of said fixed and movable frames for pivotal engagement therewith and the ball stud second portion annular groove is positioned adjacent the opposite side of the selected frame and operable to receive the retainer clip slot edge thereinto to secure the ball stud against axial movement relative to the frame opening and the resilient arm free-end is engagable with one of the ball stud second portion circumferentially spaced grooves to secure the ball stud against rotation relative to the frame opening.

2. The assembly of claim 1 wherein the ball stud second portion outer surface tapers radially inwardly in a direction from the flange towards the annular groove so as to provide a wedging action within the opening when the ball stud is secured to the frame by the retainer clip.

3. The assembly of claim 1 wherein the retainer clip has two of the resilient arms extending from the base member on opposite sides of the slot.

4. The assembly of claim 1 wherein the retainer clip body portion opposite ends include a lip that extends substantially transversely therefrom and is operative to be used as a handle in securing the retainer clip to and removing the retainer clip from the ball stud.

* * * * *